United States Patent [19]

Vandeweghe

[11] Patent Number: 5,063,762

[45] Date of Patent: Nov. 12, 1991

[54] RETRACTABLE LOCKING ASSEMBLY

[76] Inventor: Catherine M. Vandeweghe, 21 Russell Rd., Ringwood, N.J. 07456

[21] Appl. No.: 544,708

[22] Filed: Jun. 27, 1990

[51] Int. Cl.$^5$ .............................................. E05B 73/00
[52] U.S. Cl. .......................................... 70/30; 70/49; 70/58; 70/233; 280/820
[58] Field of Search ......................... 70/30, 49, 58, 233, 70/258; 280/814, 820, 821; 242/107.6

[56] References Cited

U.S. PATENT DOCUMENTS

| | | | |
|---|---|---|---|
| 1,991,825 | 2/1935 | Strickland | 70/233 |
| 3,297,333 | 5/1964 | Schwedt et al. | 280/214 |
| 3,335,585 | 8/1967 | Stratton | 70/58 |
| 3,354,675 | 9/1965 | Quigg | 70/58 |
| 3,568,902 | 7/1968 | Highberger | 224/45 |
| 3,670,535 | 6/1972 | Stettner | 70/58 |
| 3,899,904 | 7/1973 | Brimhall, II | 70/58 |
| 4,044,577 | 8/1977 | Horlacher | 70/234 |
| 4,267,715 | 5/1981 | Aylesworth | 70/58 |
| 4,543,806 | 10/1985 | Papandrea et al. | 70/30 |
| 4,585,252 | 4/1986 | Cooke | 280/820 |
| 4,597,273 | 7/1986 | Reichenberger | 70/30 |
| 4,665,724 | 5/1987 | Sakai | 70/30 |
| 4,691,545 | 9/1987 | Pagano | 70/352 |
| 4,693,098 | 9/1987 | Davis et al. | 70/233 |
| 4,870,843 | 10/1989 | Lundberg | 70/233 |
| 4,969,342 | 11/1990 | Marchiori | 70/49 |

FOREIGN PATENT DOCUMENTS

| | | | |
|---|---|---|---|
| 2509620 | 1/1983 | France | 280/820 |
| 470145 | 3/1952 | Italy | 70/30 |

Primary Examiner—Gary L. Smith
Assistant Examiner—Darnell Boucher
Attorney, Agent, or Firm—Caesar, Rivise, Bernstein, Cohen & Pokotilow, Ltd.

[57] ABSTRACT

A locking assembly to secure portable or riding equipment such as skiing equipment or bicycles, scooters, mopeds, motorcycles and the like. The assembly is mounted on the hand grips of the ski poles, or the handle bars of riding equipment with no modification of the equipment required. A retractable cable and lock is used to secure the equipment to a fixed object. The assembly, when attached to the equipment, does not disturb the weight balance of the equipment. The assembly may be installed on the hand grips or handle bars at the time of the initial assembly of the equipment or thereafter.

16 Claims, 2 Drawing Sheets

RETRACTABLE LOCKING ASSEMBLY

BACKGROUND OF THE INVENTION

This invention relates generally to a retractable locking assembly and in particular to a retractable locking assembly for securing equipment such as ski poles and skis, bicycles, and the like.

Various types of locking assemblies have been disclosed. They are used to secure portable sporting equipment such as skis and poles. Brimhall, II, U.S. Pat. No. 3,899,904 discloses a locking assembly wherein a cable is stored in the hollow section of a ski pole with its free end extending to the top of the hand grip of the ski pole. When the user wishes to secure ski poles and skis the cable is wrapped around a stationary object and the free end of the cable is inserted into an opening in the hand grip of the other ski pole. The hand grip of the second ski pole has a combination lock to release the free end of the cable when the user wishes to remove the poles and skis from the stationary object.

Aylesworth, U.S. Pat. No. 4,267,715 discloses a ski equipment lock for securing skis and ski poles to stationary objects. One of the ski poles has been modified to include an external combination lock. The pole also has a hollowed out section in which a cable is stored. When the user wishes to secure the skis and ski poles, the cable is removed from the hollowed out pole and wrapped around the skis, ski poles and a stationary object. The free end of the cable is then reinserted into an opening in the pole. The combination lock is used to free the cable when the user wishes to detach the poles and skis from the stationary object.

J. M. Quigg, U.S. Pat. No. 3,354,675 also shows a combination lock with a cable wrapped around a spool mounted on one of the ski poles. The free end of the cable after being wrapped around the ski poles and other equipment to be secured and a stationary object is reinserted back into the mechanism on the ski pole and locked into place. The combination lock is used to release the free end of the cable to detach of the equipment from the stationary object.

Reichenberger, U.S. Pat. No. 4,597,273 discloses a cable and locking mechanism stored in one ski pole. The cable again is held in a hollowed out portion of the ski hand grip and pole and the locking mechanism is mounted on the top of the ski hand grip. To secure the skis and poles, both the locking mechanism and the cable are removed from the ski pole and looped around the skis and the stationary object. A combination lock or a key may be used to release the cable.

Stettner et al. U.S. Pat. No. 3,670,535 specifies a ski equipment lock assembly which is affixed to a ski and has a spring wound cable for threading around ski equipment and a stationary object to secure the equipment.

R. C. Schwedt et al. U.S. Pat. No. 3,297,333 discloses a locking mechanism which is built into a ski pole grip. It uses a combination lock to release a free end of the strap attached to one of the ski hand grips. The free end of the strap may then be threaded through the strap of the other ski pole and around skis and a stationary object to secure the equipment.

Although the existing devices do perform their basic function of securing equipment to stationary objects to prevent theft, they have certain shortcomings. They require modification of standard equipment. Furthermore, with regard to portable equipment, the devices are not balanced after the locking assembly has been installed which can cause problems. For example, the ski locking assemblies described above create a weight imbalance between the ski poles, not only placing more weight in one pole than the other but also changing the center of gravity of one ski pole compared to the other the ski pole. Similarly, with locking assemblies used on devices such as bicycles, mopeds and the like, attachment or storage of the locking assembly to the device may cause weight or center of gravity imbalance. Weight imbalances in such equipment are disturbing to user of the equipment and affect the user's ability to perform with the equipment.

OBJECTS OF THE INVENTION

Accordingly, it is a general object of the instant invention to provide a retractable locking assembly which overcomes the shortcomings of present locking assemblies.

It is a further object of the instant invention to provide a retractable locking assembly which can be used with standard equipment without modification of such equipment.

It is still a further object of the instant invention to provide a retractable locking assembly which maintains the weight and center of gravity balance of the equipment to which it is attached.

It is still yet a further object of the instant invention to provide a retractable locking assembly for portable equipment which is easy to apply to said equipment.

It is another object of the instant invention to provide a retractable locking assembly which uses standard mechanisms and is inexpensive to produce and install.

SUMMARY OF THE INVENTION

These and other objects of the instant invention are achieved with a retractable locking mechanism which is used to secure equipment and which does not require modification of the equipment. The locking assembly has two main elements, a storage member which stores a retractable cable and a receptor member which contains a locking mechanism which accepts and locks a locking member attached to the free end of the cable.

For securing skis and ski poles, the storage member is mounted on the top of the hand grip of one of the ski poles, and the receptor member is mounted on the top of the hand grip of the other ski pole. Similarly, the storage member holding the cable may be attached to the end of one of the handle bars of a bicycle, motor scooter, moped or motorcycle, while the receptor member is attached to the end of the other handle bar.

For securing equipment, the free end of the retractable cable is pulled to remove the cable from the storage member. In the case of skiing equipment, the cable may then be wrapped around, the skis and poles and a stationary object and the locking member inserted and locked into the receptor member. The locking member on the free end of the cable may be released by use of a combination lock or key. A rewind button on a storage member causes the cable to rewind within the storage member when the cable is not in use. Similarly, for securing vehicles such as bicycles, motor scooters, mopeds or motorcycles, the free end of the cable may be inserted through a wheel or other element of the equipment and then around a stationary object, prior to insertion of the locking member into the receptor member.

DESCRIPTION OF THE DRAWING

These and other objects and many of the intended advantages of this invention will be readily appreciated when the same becomes better understood by reference to the following detailed description, when considered in connection with the accompanying drawing, wherein.

DETAILED DESCRIPTION OF THE PREFERRED EMBODIMENT

Figure 1:
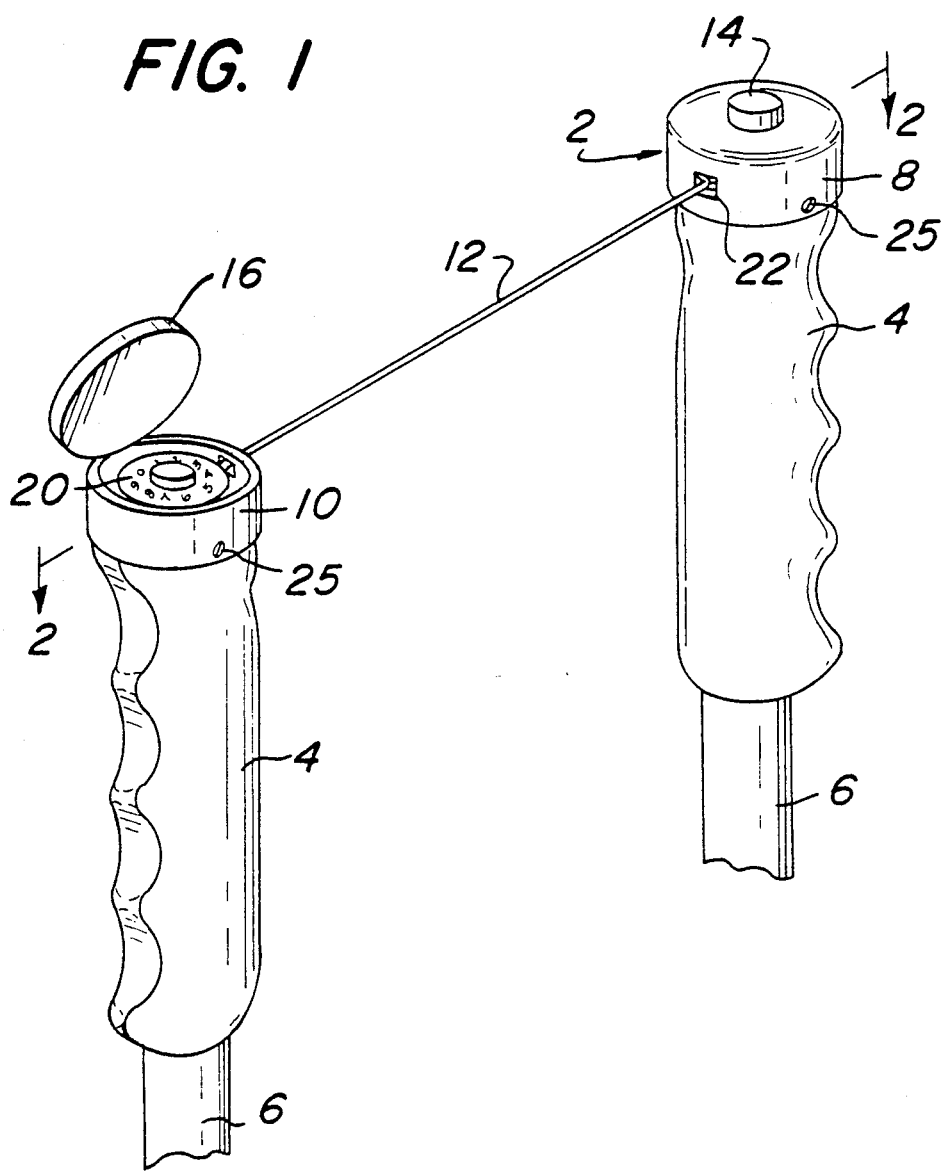
FIG. 1 is a isometric view of the retractable locking assembly mounted on the top of hand grips of ski poles.

Referring now in greater detail to the various figures of the drawing, wherein like reference characters refer to like parts, there is shown at 2 in FIG. 1, one exemplary embodiment of the retractable lock assembly in accordance with this invention. The retractable lock assembly 2 is shown mounted on hand grips 4 of ski poles 6. The assembly 2 comprises a storage member 8 mounted on one of the hand grips 4 and a receptor member 10 mounted on the other hand grip 4. Rewind button 14 of the storage member 8 when depressed will retract cable 12 into the storage member 8. Screws 25 secure the storage member 8 and the receptor member 10 to the tops of the hard grips 4.

The receptor member 10 includes a combination lock 20 and a cover 16 which is shown in its open position. When the ski poles are in use during skiing, the cable 12 is retracted into the storage member 8 and the cover 16 is placed in its closed position to protect the combination lock 20 of the receptor member 10 from weather conditions.

Figure 2:
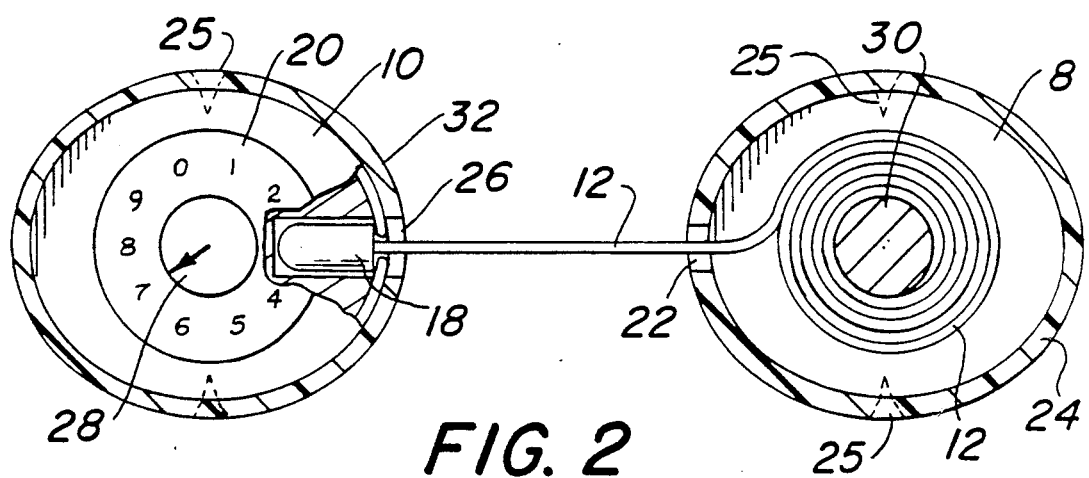
FIG. 2 is a top sectional view of the retractable lock assembly mounted on the hand grips of the ski poles, taken along the line 2—2 of FIG. 1

FIG. 2 is a cross-sectional view of the retractable locking assembly 2, taken along the line 2—2 of FIG. 1. The cable 12 is shown in its locked position, with locking member 18, attached to the free end of the cable 12. The cable 12 extends through opening 22 of the storage member 8, and the locking member 18 is inserted through opening 26 and secured by the combination lock 20. As is standard, movement of dial 28 of the combination lock 20 will lock the locking member 18, and therefore the cable 12, into place.

Operation of combination lock 20 to its preset combination numbers will release the locking member 18 so that it can be removed from the receptor member 10. Depression of the rewind button 14 will enable coil spring 30 to retract the cable 12 within the storage member 8.

Figure 3:
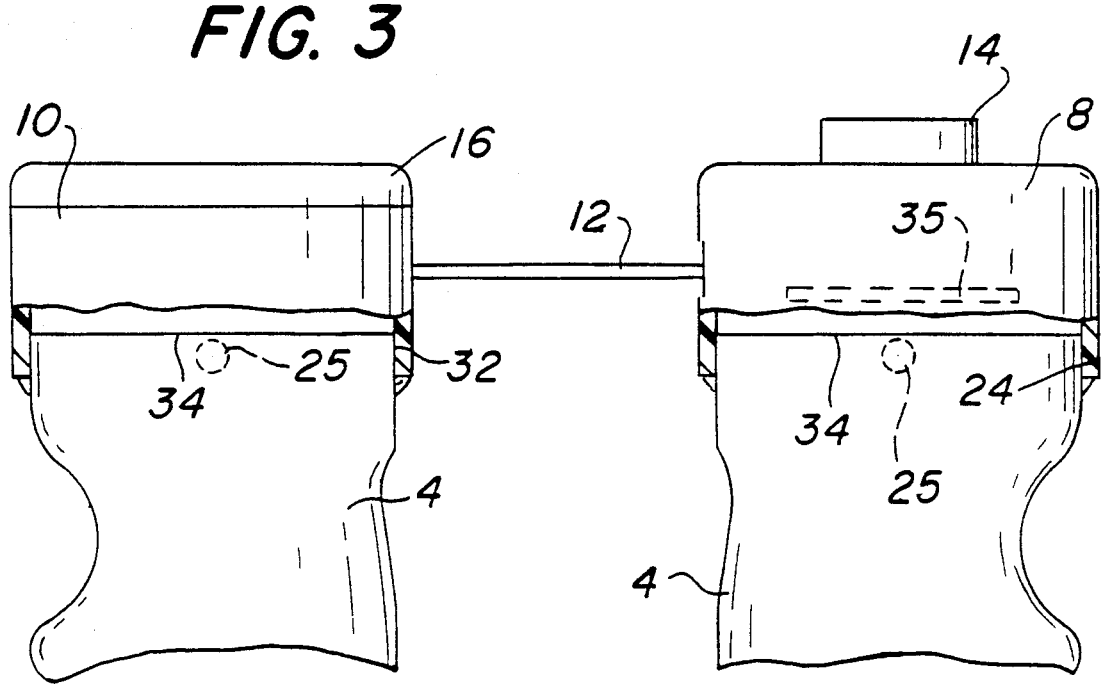
FIG. 3 is a side elevation view, partially in section, of the retractable lock assembly mounted on the hand grips of ski poles.

A side elevation view, partially in section, of retractable locking assembly 2 is shown in FIG. 3. As can be seen in FIG. 3, circumferential wall 24 of the storage member 8 is fitted onto top 34 of one of the hand grips 4, and the storage member 8 is secured to the hand grip 4 by screws 25. Likewise, circumferential wall 32 of receptor member 10 is fitted onto top 34 of the other hand grip 4, and the receptor member 10 is secured to the other hand grip 4. A shim or shims 35 of predetermined weight may be placed into either the storage member 8 or the receptor member 10, to equalize the weights of the members if required. The positioning of the shim or shims 35 can be chosen to keep the centers of gravity of the ski poles at the same position.

Figure 4:
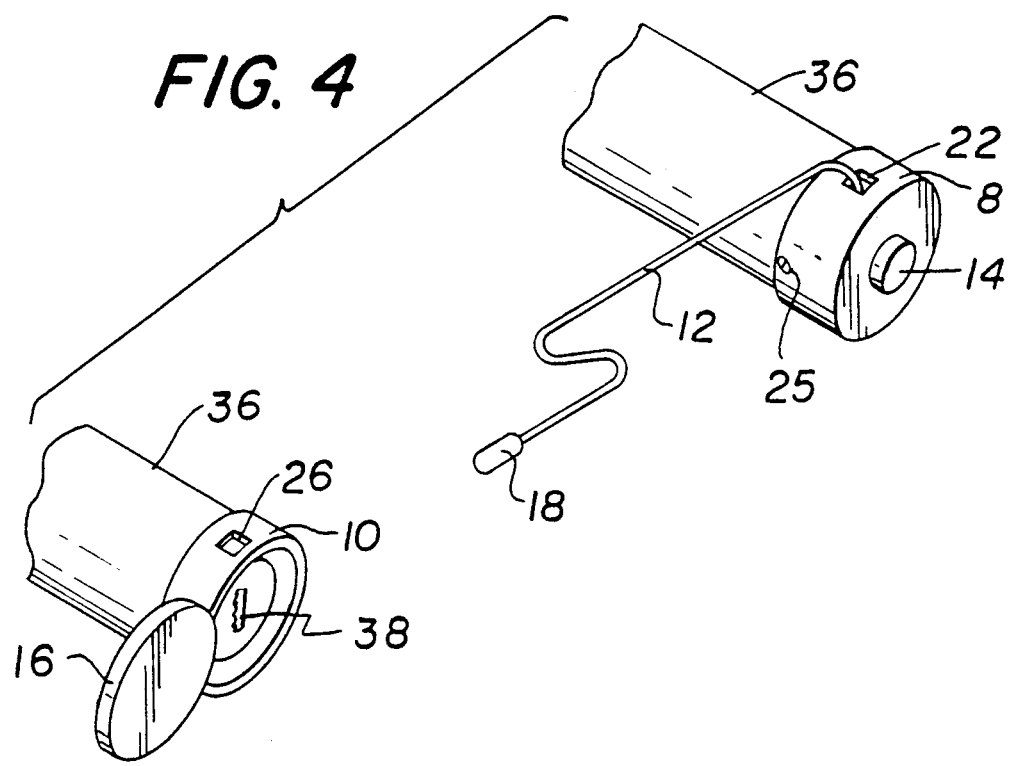
FIG. 4 is a isometric prospective view of the retractable lock assembly mounted on the ends of the handle bars of a riding vehicle such as a bicycle, motor scooter, moped or motorcycle.

The use of the retractable lock assembly 2 on riding devices such as bicycles is shown in FIG. 4. The storage member 8 is mounted on one of the handle bars 36 and the receptor member 10 is mounted on the other handle bar 36 of a bicycle, motor scooter, moped, motorcycle and the like. For securing the device, the cable 12 may be extended through parts of the device and then wrapped around a stationary object prior to insertion of the locking member 18 through the opening 26. Alternatively, instead of the combination lock 20 to secure the cable 12 as shown in FIGS. 1 and 2, a key lock may be used with the cable secured by a key entered into the key slot 38.

A retractable lock assembly has been described which can be used to secure portable or moving equipment without modification of the equipment. Furthermore, attachment of the assembly will not disturb weight and center of gravity balance of the equipment. For example, if as manufactured, a difference in weight between the storage member 8 the receptacle member 10 exists, that difference can be balanced out through the use of the shim or shims 35 placed within the storage member 8 or the receptor member 10.

The mechanism used for the combination lock 20 are standard and well known to those familiar with the art. Likewise, the mechanism used to store and retract the cable 12 is standard with tape measures in common use and are also familiar to those skilled in the art.

Cable 12 is approximately four feet in length and can be made of any flexible material which has been hardened to make cutting or destruction of the cable difficult.

Normally, in the manufacture of ski equipment, the hand grips 4 are force fitted onto the tops of the ski poles. Should the hand grips become worn or damaged they can be removed from the poles and new hand grips installed. Therefore, the locking assembly may be attached to the hand grips when the hand grips are first manufactured to be installed on the ski poles during initial assembly, and/or it can be installed on replacement hand grips prior to or after attachment of the replacement hand grips on the ski poles. Similarly, the locking assembly may be installed on the handle bars of riding equipment at the time of initial assembly or at any time thereafter.

Without further elaboration, the foregoing will so fully illustrate my invention that others may, by applying current or future knowledge, readily adapt the same for use under the varying conditions of service.

What is claimed is:

1. A locking assembly external to, and mounted on, a portable or riding device, said assembly comprising:
   (a) a storage member mounted on a first element of said device;
   (b) a receptor member mounted on a second element of said device;
   (c) a means for mounting said members on said elements;
   (d) a means for securing said device to a stationary object when said device is not in use;
   (e) a means for equalizing the weight of, said members and repositioning the centers of gravity of said members, said equalizing and repositioning means comprising at least one shim placed in said storage or receptor member so that said centers of gravity are at the same positions relative to said elements.

2. The assembly of claim 1 wherein said securing means comprises a retractable cable located within said storage member and a locking means located within said receptor member.

3. The assembly of claim 2 wherein said retractable cable has a fixed end connected to said storage member and a free end, with a locking member connected to said free end.

4. The assembly of claim 1 wherein said retractable cable has a fixed end connected to said storage member and a free end, with a locking member connected to said free end.

5. The assembly of claim 4 wherein said mounting means comprises at least one screw which attaches said storage member to said first element and at least another screw which attaches said receptor member to said second element.

6. The assembly of claim 5 wherein said locking means comprises a combination lock and a opening so that when said locking member is placed into said opening said combination lock secures said locking member into place and when said combination lock is operated by setting the combination lock to its combination said locking member is released and removed from said opening.

7. The assembly of claim 5 wherein said locking means comprises a key lock and a key for securing and releasing said locking member.

8. The assembly of claim 6 wherein said storage member further comprises a spring and a rewind button, so that when said locking member is released from said locking means, depressing said rewind button will cause said spring to retract said retractable cable into said storage member.

9. The assembly of claim 7 wherein said storage member further comprises a spring and a rewind button, so that when said locking member is released from said locking means, depressing said rewind button will cause said spring to retract said retractable cable into said storage member.

10. The assembly of claim 6 wherein said receptor member further comprises a hinged cover to protect the interior of said receptor member from the weather.

11. The assembly of claim 7 wherein said receptor member further comprises a hinged cover to protect the interior of said receptor member from the weather.

12. The assembly of claim 6 wherein said first and second elements are the hand grips of ski poles.

13. The assembly of claim 7 wherein said first and second elements are the hand grips of ski poles.

14. The assembly of claim 6 wherein said first and second elements are the handle bars of riding vehicles.

15. The assembly of claim 7 wherein said first and second elements are the handle bars of riding vehicles.

16. A method for securing portable or riding equipment comprising the following steps:
(a) providing a locking assembly external to said equipment, said locking assembly having a retractable cable mounted in a storage member with a fixed end and a free end, and a locking mechanism mounted in a receptor member;
(b) attaching said storage member to a first element of said equipment and said receptor member to a second element of said equipment;
(c) equalizing the weight of said members and repositioning the centers of gravity of said members by placing at least one shim in said storage or receptor member so that the centers of gravity are at the same positions relative to said elements and said weights are equalized;
(d) extending said retractable cable from said storage member;
(e) wrapping said retractable cable around a fixed object; and
(f) placing said free end of said retractable cable into said receptor member thereby securing said equipment to said fixed object.

* * * * *